United States Patent [19]
Gappelberg

[11] Patent Number: 5,642,931
[45] Date of Patent: Jul. 1, 1997

[54] TAXI WAND

[75] Inventor: Evan E. Gappelberg, New York, N.Y.

[73] Assignee: TaxiWand Inc., New York, N.Y.

[21] Appl. No.: 588,126

[22] Filed: Jan. 18, 1996

[51] Int. Cl.$^6$ .................................................... F21L 7/00
[52] U.S. Cl. ........................ 362/186; 362/102; 362/202; 362/205
[58] Field of Search .................................. 362/102, 186, 362/202, 205, 223, 277, 319, 356; 340/321, 322; 40/555, 586

[56] References Cited

U.S. PATENT DOCUMENTS

| | | | |
|---|---|---|---|
| 147,204 | 2/1874 | Walton . | |
| 3,622,776 | 11/1971 | Wyrick | 240/10.6 |
| 3,706,968 | 12/1972 | Turner | 340/25 |
| 3,787,675 | 1/1974 | Rushing et al. | 340/321 |
| 4,186,430 | 1/1980 | Britton | 362/162 |
| 4,231,077 | 10/1980 | Joyce | 362/32 |
| 4,364,104 | 12/1982 | Holahan | 362/223 |
| 4,425,602 | 1/1984 | Lansing | 362/186 |
| 4,646,213 | 2/1987 | Fanelli | 362/180 |
| 4,697,228 | 9/1987 | Mui | 362/352 |
| 4,744,013 | 5/1988 | Lee | 362/109 |
| 4,967,321 | 10/1990 | Cimock | 362/101 |
| 5,001,455 | 3/1991 | Starchevich | 340/332 |
| 5,050,053 | 9/1991 | McDermott | 362/204 |
| 5,079,679 | 1/1992 | Chin-Fa | 362/102 |
| 5,287,255 | 2/1994 | Strodtman | 362/102 |
| 5,307,251 | 4/1994 | Shaffer | 362/102 |
| 5,373,429 | 12/1994 | Kasurinen | 362/299 |
| 5,383,103 | 1/1995 | Pasch | 362/102 |
| 5,392,203 | 2/1995 | Harris, Jr. | 362/186 |
| 5,412,548 | 5/1995 | Yee | 362/186 |

Primary Examiner—Stephen F. Husar
Assistant Examiner—Alfred Basichas
Attorney, Agent, or Firm—Walter Scott

[57] ABSTRACT

A hand held beacon uniquely suited for hailing taxicabs is an excellent signalling device that is easy to operate and adaptable for carrying. By pushing a button on the handle portion that releases a protruding member from a groove in a light element, the tubular plastic light element that has a lower annular metal lip and that is telescoped between an outer tube and an inner copper tube springs up and closes a circuit to cause a bulb at the top of the handle portion to beam light through the light element. The transparent light element tube has a reflective, blocking layer adhesively attached to the inside of the tube other than at transparent or translucent portions defining the letters of the word "TAXI" and defining adjacent translucent annular bands. The reflective layer, which reflects light coming from outside in some embodiments is reflective also on the inside for enhanced distribution of light through the light element. On one or opposite sides of the beacon, transparent portions not blocked by reflective material beam out light in the shape of the word "TAXI", especially at night. A semispherical cover at the top of the plastic light element is made of yellow-tinted translucent plastic so it simultaneously beams light in almost all directions. The observer sees the word "TAXI" lit up with bright yellow horizontal lines of light and a half moon cover glowing next to it. The light element is pushed back into the handle housing by hand.

19 Claims, 6 Drawing Sheets

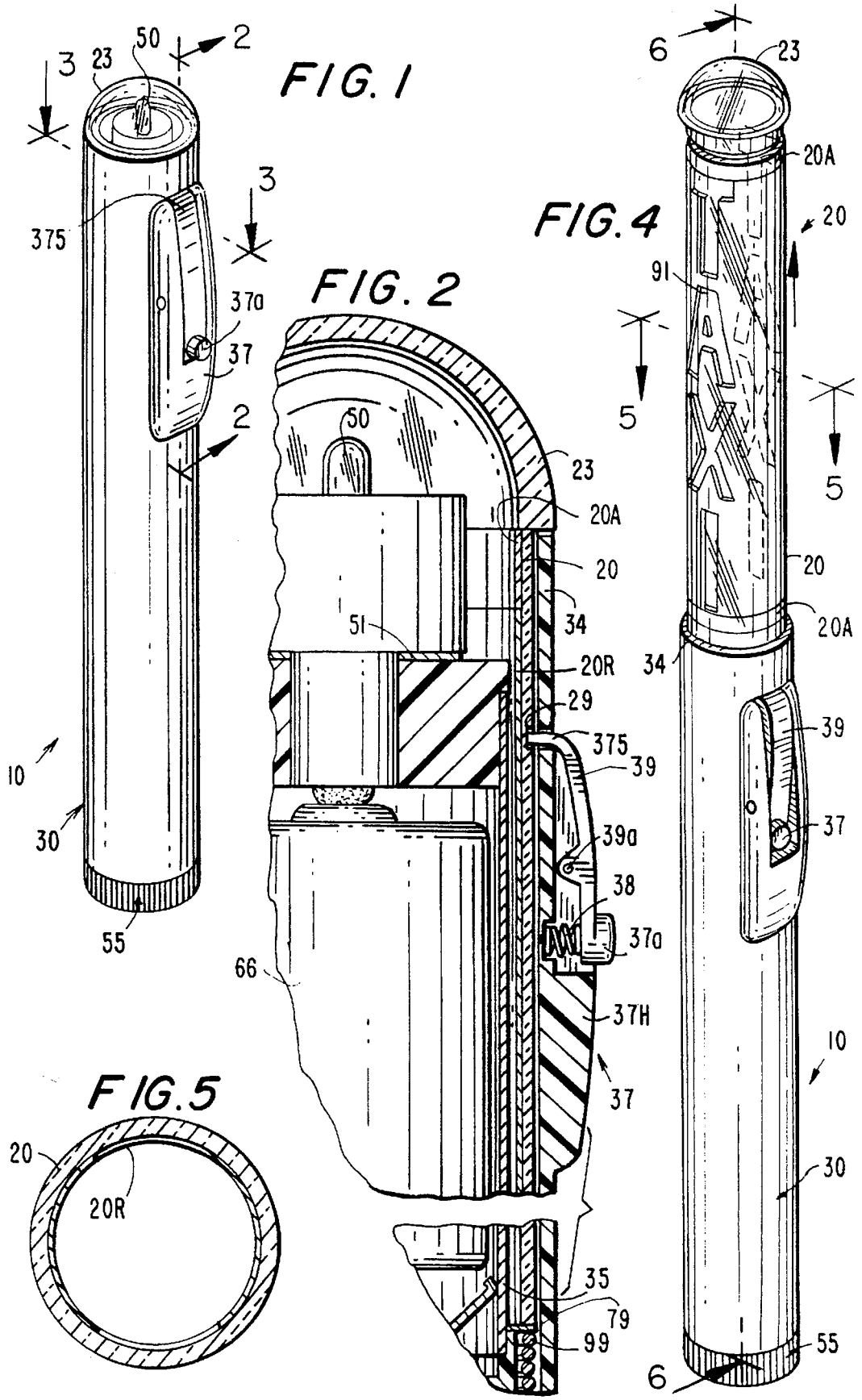

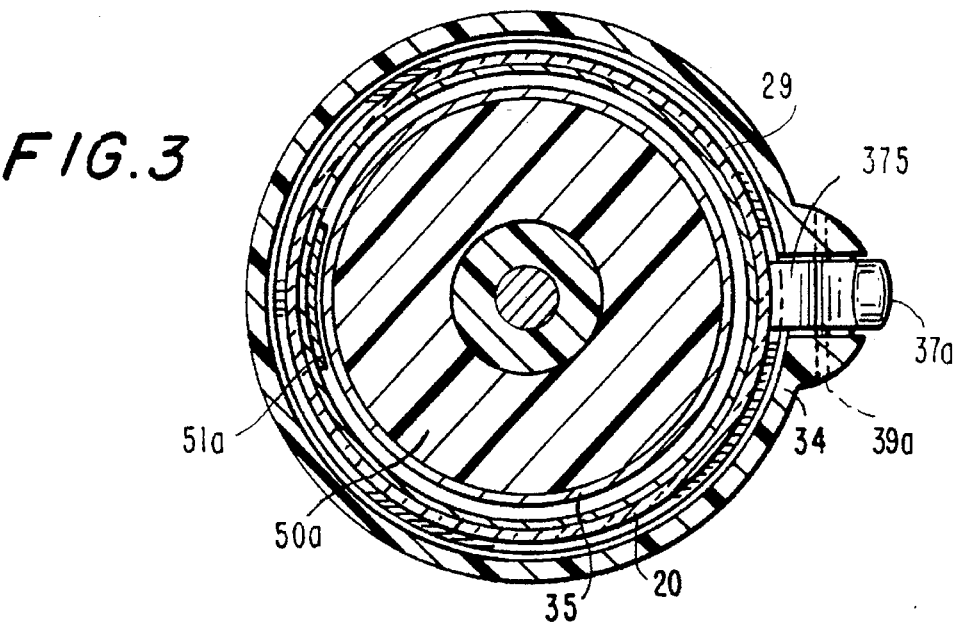
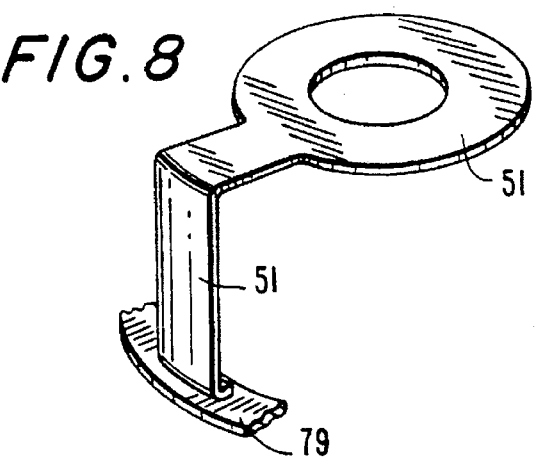
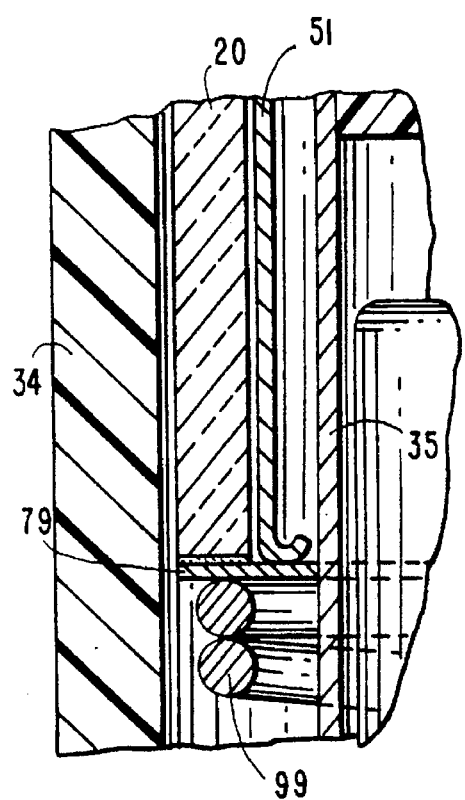

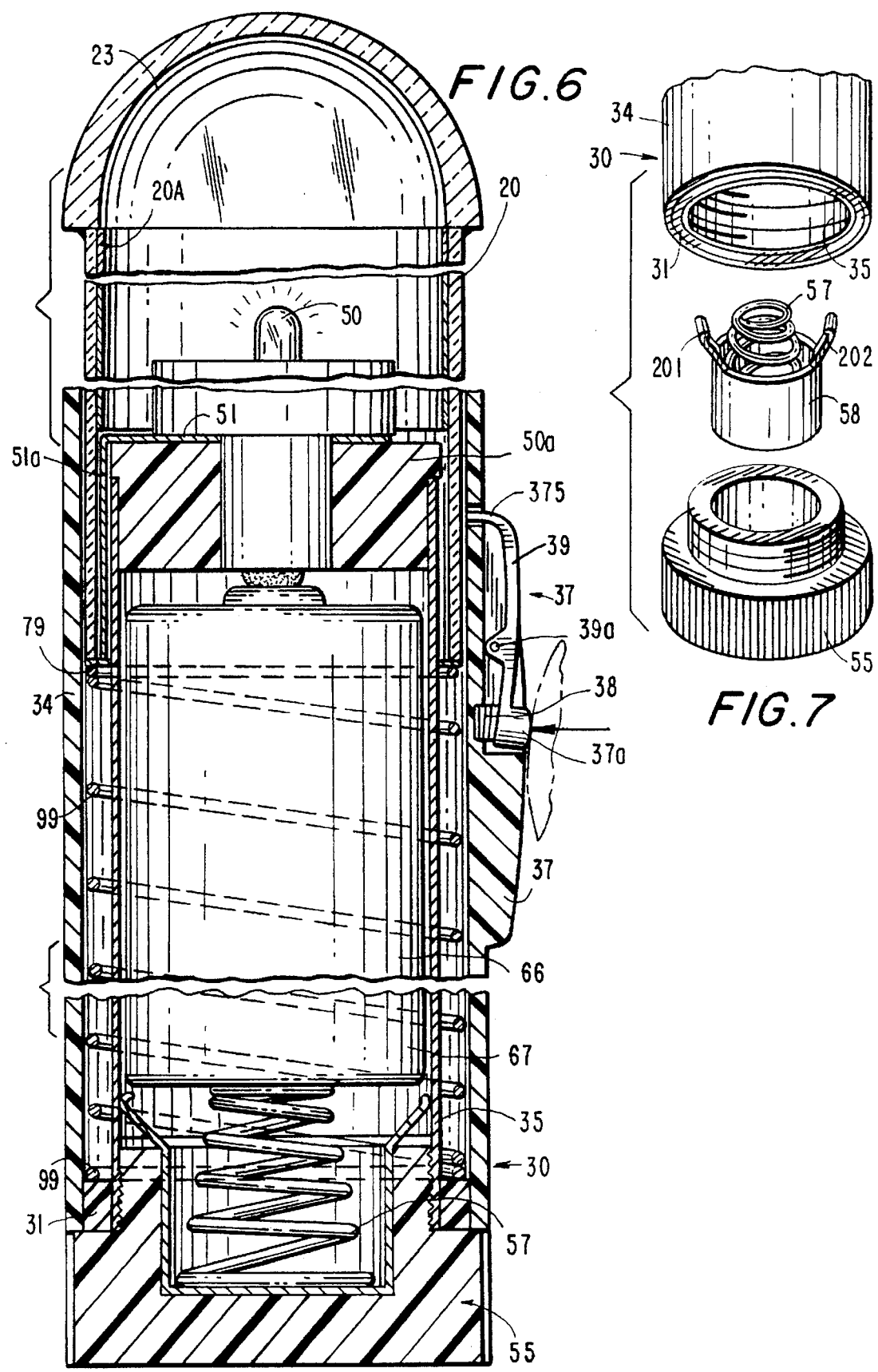

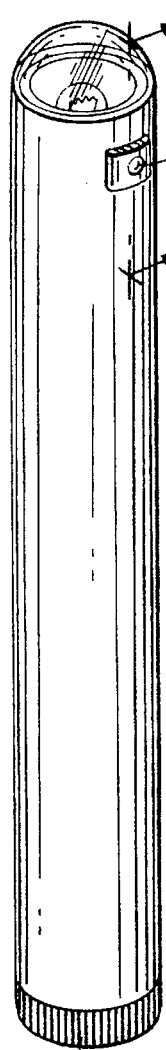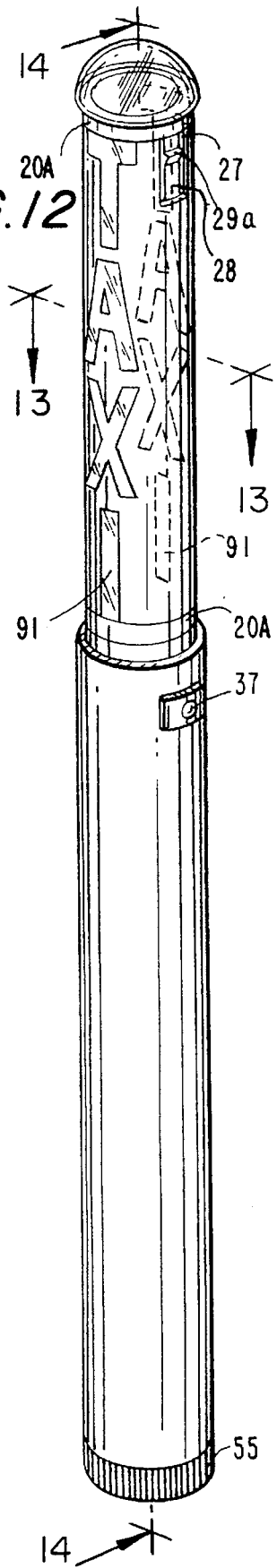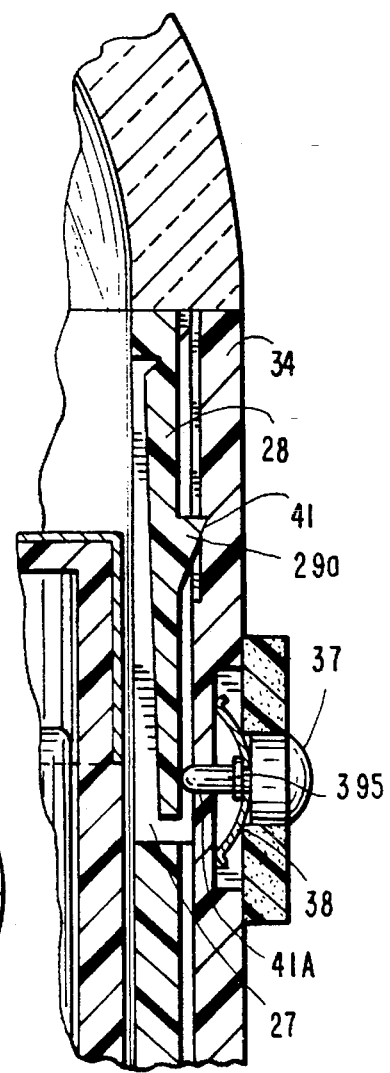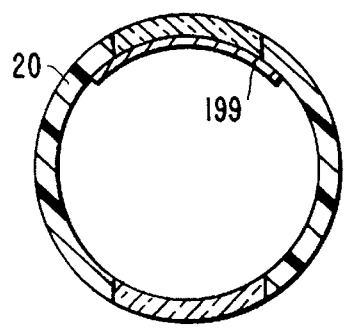

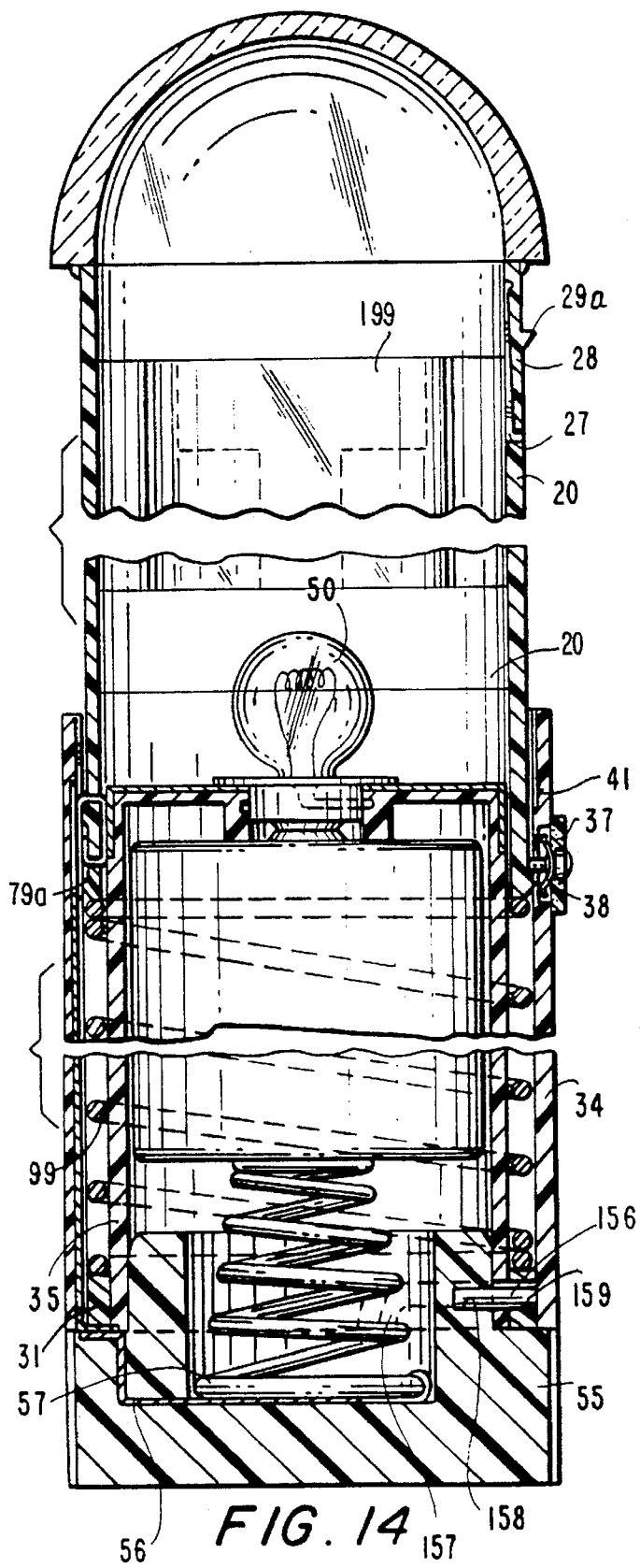
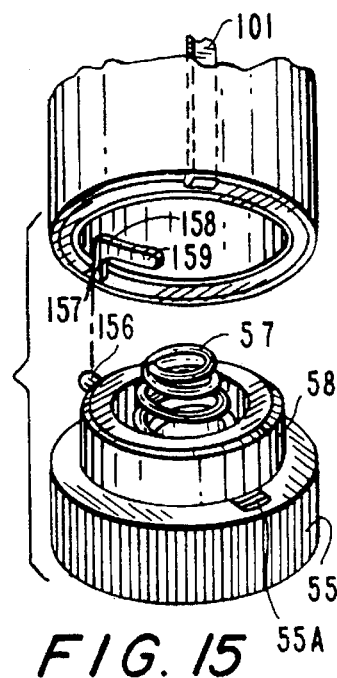
FIG. 15
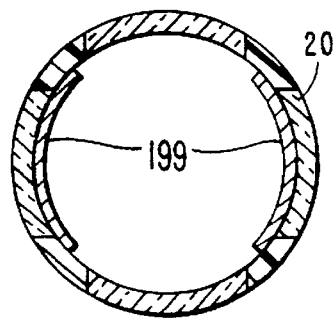
FIG. 16
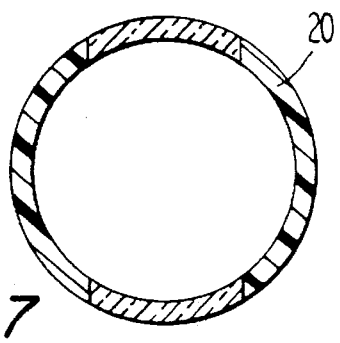
FIG. 17

TAXI WAND

BACKGROUND-FIELD OF INVENTION

This invention relates to beacons for making an individuals visible, more particularly it relates to hand-held battery-operated beacons used for signalling taxicabs, especially at night.

1. Background

It is customary in most countries, when hailing a taxicab, for the potential rider to signal the taxicab by extending his or her arm outward and/or upward. In order to make eye contact with the taxicab driver, especially when there are parked cars, signs, street lamps or other objects blocking the line of sight between a taxicab driver and oneself, the person hailing the taxicab often takes the additional step of stepping off the curb and out onto the street in order to position him or herself within the view of oncoming traffic in the hope that this traffic includes taxis. To achieve this, the person hailing the taxicab sometimes even traverses the entire first lane of traffic so that parked vehicles do not block the taxi driver's line of sight. It is somewhat dangerous to do this, however, especially at night. For example, a Jan. 5, 1996 article on page B1 of the New York Times recounted that in New York City alone just during the year 1994 there were 14,000 accidents involving cars striking pedestrians, that these accidents resulted in 240 deaths and that the first pedestrian killed by a vehicle was killed by a taxi. According to the New York City Taxi and Limousine Commission in 1994 there were 4,417 accidents involving taxicabs, 82% of which resulted in personal injuries. As a result of these statistics, jaywalking of all kinds has received increased attention as a public policy issue and statistics may be maintained as to the number of annual accidents caused by taxicabs attempting to cross lanes or otherwise being careless in trying to reach someone that is signalling them for a ride.

Furthermore, when signalling a taxicab, success can lead to other problems. For one thing, two taxicabs may show up at the same time and compete getting to you fastest. Second, the taxicab that notices you may be travelling in a traffic lane on the opposite side of the street and may only notice you only half a block away, in which case to respond to your signal it would have to cut across the lanes of traffic to get to you. Either of these additional problems could cause an accident.

2. Prior Art

Light signalling devices are known in the prior art either to direct airplanes taxiing on the runway or for policemen to direct pedestrians or traffic. None of these devices are uniquely suited for hailing taxicabs, as the present invention is.

U.S. Pat. No. 4,231,077 to Joyce discloses a light toy having a light source such as a bulb that sends a beam of light into a nonopaque tube along its axis. The beam is reflected back into the tube by a reflective surface on the inner side of the cap at the other end. It could be used for signalling or as a toy. This device is ill suited to hailing taxicabs. One would have to walk around with a science fiction looking device with a light element sticking out of it—that is, it lacks a convenient mechanism for shifting from "use" position to carrying position. Furthermore, it would not be easily understood by taxicab drivers to indicate an attempt to signal a ride.

U.S. Pat. No. 5,287,255 to Strodtman discloses a combination flashlight-baton in which the tail end of the device flashlight barrel has telescoping tubular members attached to a spring that extends outward with a snap of the wrist. To extend the baton, the user holds the flashlight by the handle with the tail end pointing away and sharply snaps the wrist forward in a slinging action so that the telescoping members are extended outwardly due to the centrifugal force. While the Strodtman patent contains telescoping tubular members that are shifted outward when the device is in "use" position, this device too is ill suited for hailing a taxicab and would not be instantly recognized by taxicab drivers as an attempt to signal a ride. Furthermore, the sharp snapping action that is required to activate the Strodtman device is singularly ill suited to hailing a taxicab amidst others doing the same in a crowded area. In addition, since the light extends axially outward rather than radially it is not suited for signalling at all but rather for shedding light on another object.

Numerous devices are known for modification of flashlights but none of these are uniquely suited for hailing a taxicab. For example, U.S. Pat. No. 4,697,228 to Mui discloses a collapsible light wand formed from a telescopic tube assembly comprised of a plurality of overlapping translucent tube sections, the outermost tube section being removably attachable to the light source end of a flashlight. Other examples are U.S. Pat. No. 5,383,103 to Pasch and U.S. Pat. No. 5,307,251 to Shaffer which disclose a flashlight wand attachments for use as pedestrian crossing devices and to direct traffic. These devices are also not suited for hailing a taxicab. Since the light extends axially and not radially these devices would not be visible from all directions. In addition, the devices would not be recognized as an attempt to signal for a ride in a taxicab. The devices also do not contain an effective mechanism for shifting from "carry" position to "use" position.

U.S. Pat. Nos. 4,646,213 to Fanelli, 4,186,430 to Britton and 147,204 to Walton each teach the idea of a telescoping lantern containing a spring held light source, in this case a candle, that is held within a cylindrical housing. None of these would be suitable for use in hailing a taxicab and also suffer from the drawbacks already mentioned.

For both safety and convenience, there is a pressing need for a hand held beacon uniquely suited for hailing taxicabs, particularly at night, but also adaptable for daytime use, especially one that is convenient to carry, easy to operate and adaptable to being carried by hand, in carrying cases, purses and the like when the light is in "off" mode. It is especially important that the device, when held and activated, be one that would be instantly recognized by taxicab drivers as an attempt to signal for a ride in a taxicab.

SUMMARY OF THE INVENTION

The present invention is a hand held beacon uniquely suited to hailing taxicabs. In general, it is an excellent signalling device that is easy to operate and adaptable for carrying. By pushing a button that activates a spring mechanism, the tubular telescoping bright yellow or clear plastic light element pops up and closes a circuit causing a bulb at the top of the handle portion to beam yellow light radially outward to signal one's presence.

In the preferred embodiment the light element tube is transparent but it contains a thin layer of material reflective on both sides adhesively attached to the inside of the light element tube. This reflective layer is located everywhere on the inside except at portions thereof that are in the shape of the word "TAXI" and at annular bands at the top and bottom of the light element. The inside reflective layer serves the triple purpose of (i) enhancing the light emitting capacity of the light element by reflecting light coming from outside the entire device, (ii) blocking light from the bulb from being emitted other than through the areas of the lettering, the upper and lower annular bands and the top cover and (iii) distributing the light from the bulb throughout the inside of the light element. As a result, light only escapes through the transparent or translucent yellow lettering on opposite sides (or on only one side) in the shape of the word "TAXI", through the upper and lower annular bands and through the top cover thus causing these areas to be boldly lit up, especially at night. The semispherical cover at the top end of the plastic light element and the upper and lower annular bands are made of yellow translucent plastic and the cover in particular beams light in almost all directions. Accordingly, the observer sees the word "TAXI" lit up with a bright yellow line of light above and below it adjacent a glowing yellow cover.

In the alternative embodiment, the light element is a transparent tube that is then painted or sprayed black or made opaque except at the portions defining the word "TAXI", where light escapes, and at the lower and upper annular bands of translucent yellow plastic. This alternative embodiment itself has three versions (a), (b) and (c). In version (a) of the alternative embodiment, one of the opposite sides of the light element has the transparent lettering but the other side has an inside reflective layer in the shape of the letters of the word "TAXI". The inside reflective layer is called "inside" only because it is located inside the light element tube but it is actually reflective to an outside observer looking into the light element. In version (b) both opposite sides have transparent lettering. In version (c) there are two opposite transparent sides and two other opposite reflective sides ninety degree rotationally away from the first two opposite transparent lettering sides.

In general, reflective lettering light up even during the daylight. In addition, in order to increase the amount that the light traveling through the light element penetrates and brightly highlights the transparent lettering, a light enhancement means may be utilized for the alternative embodiment, for example a paper thin strip of reflective material may be adhesively attached to certain portions of the inside of the light element.

When not needed for use, the light element is pushed back into the handle housing by hand. In some embodiments it may be envisioned that the light element can be returned to the closed position by pushing the button a second time. The device is adaptable for carrying and can be placed into a purse, or small carrying case.

OBJECTS

It is therefore an object of the present invention to provide a cylindrical hand-held beacon having a "pop up" battery operated spring-activated light element that can be used to signal taxicabs during the day and night.

It is also an object of the present invention to provide a cylindrical hand-held beacon having a spring-activated light element that lights up when a push-button activation mechanism causes it to spring up and or pop out of the space between an inner and an outer tube in the handle portion of the beacon that the light element is in during the closed position thus causing a metal on metal connection to complete an electric circuit.

It is also an object of the present invention to provide a cylindrical hand-held beacon having a pop up spring-activated light element wherein the light element has the word "TAXI" depicted thereon so that light from within the light element radiates out of a semispherical end of the beacon as well as through transparent or yellow translucent lettering.

It is also an object of the present invention to provide a cylindrical hand-held beacon having a pop up spring-activated light element wherein the light element has a layer of reflective material on the inside of the light element that serves the threefold purpose of (i) blocking light from being emitted other than through lettering portions in the shape of the word "TAXI", upper and lower annular band of translucent yellow plastic and a top cover, (ii) reflecting light entering the light element tube from outside the device and (iii) distributing light from the bulb throughout the inside of the light element so that as a result an observer sees the word "TAXI" depicted on the beacon.

It is also an object of the present invention to provide a cylindrical hand-held beacon having a pop up spring-activated light element wherein the light element has a layer of reflective material on the inside of the light element that is attached by transparent glue on all or part of the surface of the reflective layer or where the reflective layer consists of reflective paint sprayed onto the inside of the light element tube.

It is also an object of the present invention to provide a cylindrical hand-held beacon having a pop up spring-activated light element wherein in an alternative embodiment the light element is painted opaque and has the word "TAXI" depicted on transparent portions and on the opposite side of the beacon has the word "TAXI" depicted either on transparent portions or on reflective lettering adhesively attached to the inside of the light element tube.

It is also an object of the present invention to provide a cylindrical hand-held beacon having a pop up spring-activated light element wherein in an alternative embodiment the light element is painted opaque and has the word "TAXI" depicted on opposite transparent portions and on two other opposite side of the beacon has the word "TAXI" depicted on reflective lettering adhesively attached to the inside of the light element tube.

It is still a further object of the present invention to provide a cylindrical hand-held beacon having a pop-up spring-activated light element wherein the light element has both transparent lettering capable of receiving light emitted from the inside of the beacon and reflective lettering capable of reflecting light emitted from areas surrounding the beacon during the day.

It is still a further object of the present invention to provide a cylindrical hand-held beacon having a pop-up spring-activated light element wherein light enhancement means such as a paper thin strip of reflective material is adhesively attached to the inside of the light element in order to increase the amount that the light traveling through the light element penetrates and brightly highlights the transparent lettering.

These and other objects will become increasingly apparent to those of ordinary skill in the art by reference to the following description and to the drawings.

BRIEF DESCRIPTION OF THE DRAWINGS

FIG. 1 depicts a perspective view of a preferred embodiment of a beacon in accordance with the present invention shown in the collapsed position.

FIG. 2 depicts a cross-sectional view of a preferred embodiment of the present invention taken along line 2—2 of FIG. 1.

FIG. 3 depicts a cross-sectional view of a preferred embodiment of the present invention taken along line 3—3 of FIG. 1.

FIG. 4 depicts a perspective view of a preferred embodiment of a beacon in accordance with the present invention shown in an extended position.

FIG. 5 depicts a cross-sectional view of the light element of the beacon of the present invention taken along line 5—5 of FIG. 4.

FIG. 6 depicts a cross-sectional view of the beacon the present invention taken along line 6—6 of FIG. 4.

FIG. 7 depicts a partial exploded perspective view of the detachable bottom of the handle portion of the beacon of the present invention.

FIG. 8 depicts a perspective view of metallic clip attachment to the bulb contacting the annular metallic ring at the bottom end of the light element when the beacon is in the extended position.

FIG. 9 depicts a partial cross-sectional view of the completed electric circuit in the preferred embodiment when the beacon of the present invention is in the extended position.

FIG. 10 depicts a perspective view of an alternative embodiment of the beacon of the present invention in collapsed position.

FIG. 11 depicts a cross-sectional view of then alternative embodiment of the beacon of the present invention taken along line 11—11 of FIG. 10.

FIG. 12 depicts a perspective view of an alternative embodiment of a beacon in accordance with the present invention shown in an extended position.

FIG. 13 depicts a cross-sectional view of the alternative embodiment of the beacon of the present invention taken along line 13—13 of FIG. 12.

FIG. 14 depicts a cross-sectional view of one version of an alternative embodiment of the beacon of the present invention taken along line 14—14 of FIG. 12 with transparent lettering on one side and reflective lettering on the opposite side, FIG. 15 depicts a partial exploded perspective view of an alternative embodiment of the detachable bottom of the handle portion of the beacon of the present invention.

FIG. 16 depicts a cross-sectional view of a second version of the light element in an alternative embodiment of the beacon of the present invention with transparent lettering on opposite sides.

FIG. 17 depicts a cross-sectional view of a third version of the light element in an alternative embodiment of the beacon of the present invention with transparent lettering on two opposite sides and reflective lettering on two opposite sides.

DETAILED DESCRIPTION OF THE DRAWINGS

The General Structure of the Device

Figure 18:
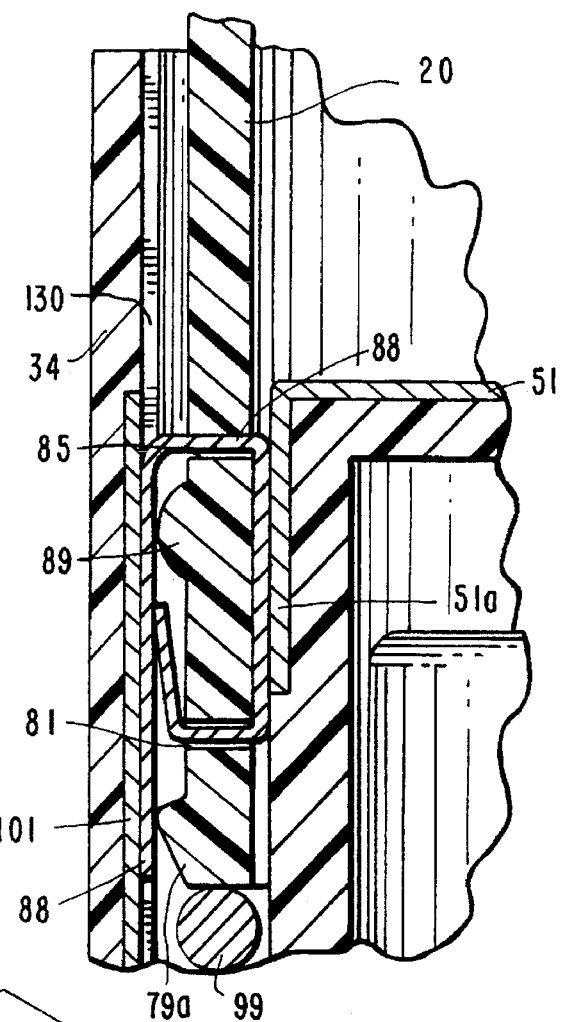
FIG. 18 depicts an enlarged partial cross-sectional view of the completed electric circuit in the alternative embodiment of the beacon of the present invention when the beacon is in the extended position.

A seen in FIGS. 1–9, the device 10 is a beacon 10 which is comprised of elongated tubular light element 20 which telescopes into elongated tubular handle portion 30 when beacon device 10 is in its closed position. Handle portion 30 is itself generally made of an open ended inner copper tube 35 within an open ended outer plastic tube 34. In an alternative embodiment, as seen in FIGS. 10–19, the inner tube 35 may be made of plastic in which case the electrical connections are designed differently, as described below. In both embodiments, the inner tube 35 of handle portion 30 connects snugly to but is spaced apart from the outer tube (also called the outer housing) 34 of handle portion 30 by means of a very short open-ended tubular fit-in piece 31 that occupies the very lower end of the space between inner tube 35 and outer tube 34 at the bottom of handle portion 30. In a closed position, the light element 20 sits on a coil spring 99 that sits on this fit-in piece 31. Coil spring 99 sends an upward force onto light element 20 in the closed position but this force is blocked because, as described in further detail below, the light element 20 has, in the preferred embodiment, an annular groove 29 near its top that catches a protruding member of the button mechanism when the button mechanism on outer tube 34 of handle portion 30 is in closed position. The fact that annular groove 29 is around the entire circumference of light element 20 insures that light element 20 will snap closed even if light element 20 turns left or right relative to housing 30. In the alternative embodiment, as seen best in FIGS. 11–12, the light element has a catch 29a that is caught in an opening 41 in outer tube 34 of handle portion 30. In the alternative embodiment, moreover, light element 20 should not turn relative to housing 30 during normal use because of how metal strip 88, fits into groove 130, as described below.

As seen in either embodiment in FIGS. 1, 2 and 10, bulb 50 fits snugly into a bulholder 50a which fits into the hollow inside at the top of inner tube 35. For best results, bulb 50 should be a high intensity bulb. Bulb 50 has a bottom end which sits on and comes into contact with the positive terminal at the top of battery 66, the upper of two cylindrical batteries that are inserted one on top of the other in a conventional manner (lower battery's 67 positive terminal contacting upper battery's 66 negative terminal) into the hollow space of inner tube 35 from its bottom. This insertion of batteries can be accomplished by screwing off the, detachable bottom 55 of handle portion 30. Detachable bottom 55 has a coil spring 57 that fits into a cup 58a that fits into a housing or flange 58 and that extends upward. The negative terminal of battery 67, the lower of the two batteries, sits on coil spring 57 inside inner tube 35. Housing 58 for spring 57 has threading around to allow detachable bottom 55 to be screwed into the bottom of handle portion 30. In the primary variation of the detachable bottom 55 of the preferred embodiment of the beacon 10, as seen in FIG. 7, two metallic tabs 201, 202 jut out diagonally at the top of cup 58a in housing 58 for spring 57 to create a metal on metal connection between the housing 58 and inner tube 35 when the detachable bottom 55 is screwed in after insertion of the batteries. Alternatively, as also seen in FIG. 7, the top part of cup 58a in housing 58 may be conical so as to engage the entire circumference of inner copper tube 35.

As seen in FIGS. 8–9, for the preferred embodiment (depicted in FIGS. 1–9), bulb 50 has attached to it a metal clip 51a that depends downward from metallic ring 51 surrounding the bulb 50. Because of piece 51b between metallic ring 51 and metal clip 51a, metal clip 51a does not make contact with copper inner tube 35. This gap is bridged, however, when the light element 20 reaches a fully extended position, as in FIG. 4, because, as seen best in FIG. 9, the lower metal lip 79 of light element 20 creates a metal connection or link between inner copper tube 35 and metal clip 51a.

Figure 19:
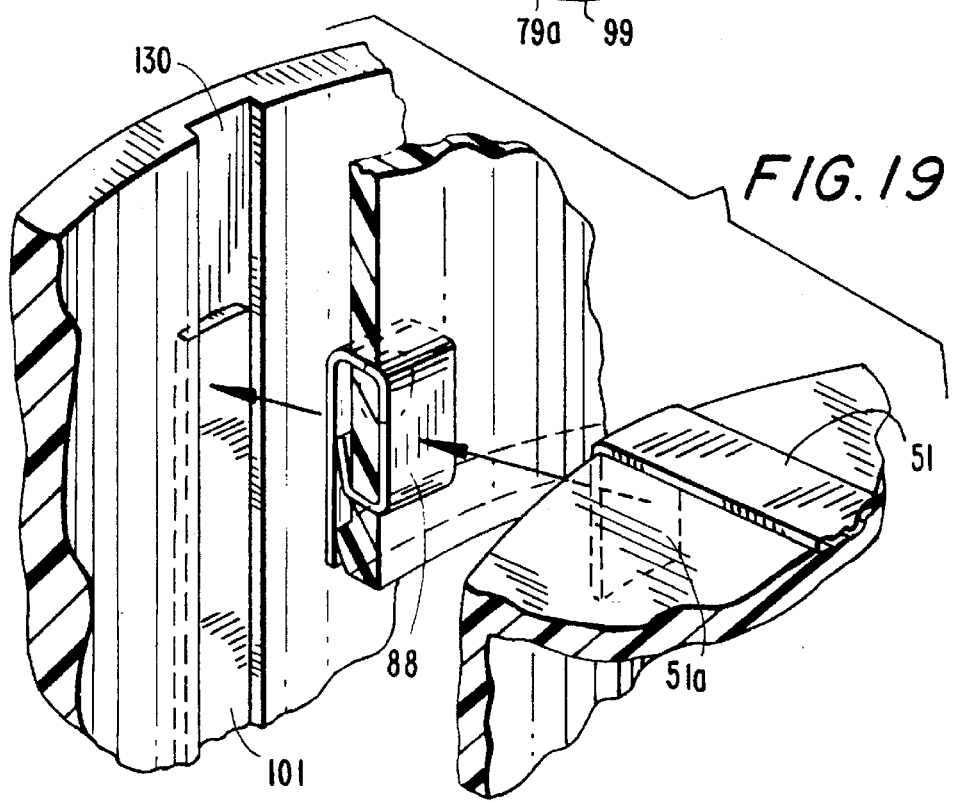
FIG. 19 is a partial exploded perspective view of those elements of the alternative embodiment of the beacon depicted in FIG. 18.

In the alternative embodiment of beacon 10, as best seen in FIGS. 18 and 19, rectangular metal strip 101, which is 180 degrees rotationally distant from button 37 described below, stretches along the top length of outer tube 34 from a high point on outer tube 34 that is across from bulb 50 in the preferred embodiment. This allows the electrical circuit to be completed when the light element 20 is in open position, as described further below. Rectangular, long metal strip 101 fits into a rectangular groove 130 in outer tube 34 and stretches along most of the length of outer tube 34 from a high point on outer tube 34 that is across from bulb 50 to a low point that contacts metal strip 56 of detachable bottom 55. In this alternative embodiment, where the inner tube is not lightweight copper but plastic, the alignment of metal tab 55a in detachable bottom 55 with long metal strip 101 would have to be insured, for example by ensuring that the detachable bottom 55 could only be screwed into place in a forced manner. One such design would be a "push and turn" design wherein the detachable bottom would be pushed in and then turned so that the detachable bottom 55 would be forced into its proper place in relation to the bottom of handle portion 30 when the detachable bottom is inserted. As seen in FIGS. 14, 15, this could be accomplished by having a so-called "bayonette" connection wherein pin 156 on bottom 55 matches the vertical portion 157 of "L"-shaped groove 158 in fit-in piece 31. When the bottom 55 is put in, pin 156 first enters vertical portion 157 and then, when the bottom 55 is turned, horizontal portion 159 of "L"-shaped groove 158. Thus, detachable bottom 55 cannot be turned further nor can it be pulled out but it can only be turned the other way to be removed.

For the preferred embodiment, there is no need to ensure alignment between detachable bottom 55 and the bottom of handle portion 30 since the entire inner tube 35 is copper. In all embodiments, the detachable bottom 55 is flat on its bottom so the entire device 10 can stand in closed position on a desk as an attractive device.

Light Element

As seen in FIGS. 2–6 and 12–14, light element 20 is a hollow plastic tube that is open at the bottom. At the top of light element 20 is a semi-spherical translucent yellow-tinted plastic cover 23 whose outer diameter approximately equals the outer diameter of the outer tube 34 of handle portion 30, whose thickness approximately equals the thickness of outer tube 34 and whose inner diameter approximately equals the outer diameter of light element 20.

In the preferred embodiment, as best seen in FIGS. 2, 6, light element 20 has an annular groove 29 near its top that catches a protruding member 375 of the button mechanism 37 when the button mechanism 37 on the outer tube 34 of handle portion 30 is in closed position. As seen in FIGS. 1–3, light element 20 fits snugly between inner tube 35 and outer tube 34 of handle portion 30 when the device 10 is in the closed position. When the light element 20 is inside handle portion 30, i.e. when device 10 is in closed position, protruding member 375 catches in the annular groove of light element 20.

In the alternative embodiment, as seen in FIG. 10–11, light element 20 has an angular "U"-shaped slit opening 27 near the top of and formed out of its side wall. This slit opening 27 results in a bendable rectangular strip 28 having catch 29a at its top formed out of the side wall of light element 20. Light element 20 fits snugly between inner tube 35 and outer tube 34 of handle portion 30 when the device 10 is in the closed position. When the light element 20 is inside handle portion 30, i.e. when device 10 is in closed position, catch 29a catches and forcefully fits into opening 41 carved out of outer tube/housing 34.

Activating the Device From Closed to Open Position

The device 10 converts to the open or extended position from the closed position as follows. As best seen in FIGS. 2 and 11, button releasing or disengaging means 37 is provided to release the light element 20 from its telescoped position within the space between the inner tube 35 and the outer tube 34 of handle portion 30. A button knob 37a on outer housing 34 of handle portion 30 juts out of button mechanism 37 and is conveniently accessible to be pressed down by the thumb of the person holding device 10. The button 37 is surrounded by soft plastic housing 37H.

In the preferred embodiment, as seen in FIG. 2, the button knob 37a is attached to a coil spring 38 and the button knob 37a can be pushed inwardly against spring 38 mounted thereon. Button knob 37a is connected to lever 39 which pivots on pivot pin 39a. When button knob 37a is pushed lever 39 causes protruding member 375 to be pulled out of engagement with annular groove 29. Light element 20 is then subject to the upward force of coiled spring 99 that light element 20 sits on in the lower part of the space between inner tube 25 and outer tube 34 of handle portion 30 and light element 20 pops up into extended position, as seen in FIG. 4.

As seen in FIG. 11, in an alternative embodiment of the button release means 37, the button knob 37a is attached to a leaf spring 38 which can be bent by pushing button knob 37a perpendicular to outer housing 34. Spring 38 is connected to tiny pin 395 so that when button knob 37a is pushed pin 395 traverses hole 41A in outer housing 34 and presses perpendicularly against bendable rectangular strip 28 thus releasing catch 29a from opening 41, whereupon light element 20 is subject to the upward force of coiled spring 99 that light element 20 sits on in the lower part of the space between inner tube 25 and outer tube 34 of handle portion 30.

Accordingly, after button knob 37a is pushed, light element 20 pops up and lights up since, as described in further detail below, when light element 20 is fully extended a metal on metal connection is made that completes an electric circuit involving the batteries. The light element 20 is returned to closed position inside handle portion 30 by simply pushed light element 20 down.

In the preferred embodiment, as seen by FIG. 8, when light element 20 springs up into open position it does not, however, entirely leave handle portion 30 because light element 20 has a protruding lower lip 79 around the entire circumference of light element 20 at the very bottom of light element 20. Lip 79 gets blocked by metallic clip 51a depending from metallic ring 51 surrounding bulb 50. In the alternative embodiment, when light element 20 springs up into open position it also does not entirely leave handle portion 30 because light element 20 has a protruding lower lip 79a around the entire circumference of light element 20 at the very bottom of light element 20. Lip 79 gets stuck because outer tube 34 narrows at its very top. In the preferred embodiment, this lower lip is a metallic ring 79 which plays a role in completing the electrical circuit, as described below whereas in the alternative embodiment lower lip 79a may be plastic since it does not play such a role.

In the preferred embodiment, as seen in FIGS. 4 and 5, the light element 20 is a transparent tube having a thin layer of reflective material 20R adhering to the inside wall of the light element tube 20. This material consists of a thin layer of fabric type material reflective on both sides adhesively attached to the inside of the light element tube by transparent glue or paint either on the entire surface of the reflective layer or on its top and bottom. The reflective material can be the standard reflective material such as the kind used on bicycles to reflect light at night. This reflective layer 20R is located everywhere on the inside of light element 20 except at portions thereof in the shape of the letter of the word "TAXI" and at annular bands 20A of translucent yellow at the top and bottom of the light element 20 (and except for the translucent cover 23 of light element 20). The inside reflective layer 20R serves the triple purpose of (i) enhancing the light emitting capacity of the light element by reflecting light coming from outside the entire device, (ii) blocking light from the bulb from being emitted other than through the areas of the lettering, the upper and lower annular bands and the top cover and (iii) distributing the light from the bulb throughout the inside of the light element. The areas of the lettering may be transparent or translucent. As a result, light only escapes through the transparent or translucent yellow lettering on opposite sides (or on only one side) in the shape of the word "TAXI", through the upper and lower annular bands 20A and through the top cover thus causing these areas to be boldly lit up, especially at night.

In the alternative embodiment, as seen in FIGS. 12, 13, 16 and 17, the light element 20 is sprayed or painted so that it entirely opaque, preferably black, except at the location of the transparent vertical lettering 91 of the word "TAXI", except at the lower and upper annular bands 20A which are translucent yellow and except for the translucent cover 23 of light element 20. The vertical lettering 91 can consist of transparent or translucent plastic that allows the light emanating from bulb 50 through the inside of light element 20 to be emitted through the lettering 91. In some cases or at certain parts of the light element, the lettering 91 can consist of reflective material on the inside of light element 20 in the shape of the letters "T A X I" adhesively attached to the inside wall of light element 20. The reflective material can be silvery or can be the standard reflective material used on bicycles. Three versions of the light element 20 for the alternative embodiment of beacon 10 depicted in FIGS. 13, 16 and 17 arise from various combinations of reflective and transparent lettering.

FIG. 13 depicts the version of the light element 20 in the alternative embodiment of beacon 10 whereby on one side of light element 20 are the transparent vertical lettering of the word "TAXI" usable at night whereas on the other side is the reflective lettering usable during the day. In this embodiment, light enhancement means, for example, a strip of thin reflective material 199 adhesively attached to the inside wall of light element 20, may be utilized for the purpose of increasing the amount of light emanating from the bulb 50 through light element 20 that exits transparent lettering 91. Other light enhancement means may be envisioned and the invention is not limited to the use of reflective lettering. For example, the light enhancement means may include mirrors inside the light element or may involve opaque walls that direct the light toward the lettering while at the same time permit the light that does not exit the transparent lettering to be directed to the translucent cover. This light enhancement means 199, enhances the visibility of the word "TAXI" to an observer, such as a taxi driver while simultaneously permitting the semispherical cover 23 to be lit up brightly.

FIG. 16 depicts a second version of light element 20 in the alternative embodiment of beacon 10 wherein the lettering on light element 20 is present as transparent vertical lettering (areas where the light element 20 has not been painted or colored) on both opposite sides and in addition to that, in between the two opposite sides, are reflective lettering 91 ninety degrees rotation away from the transparent lettering 91. FIG. 17 depicts a third version of the light element 20 wherein on each of opposite sides of light element 20 are the transparent vertical lettering 91 of the word "TAXI" usable at night. In this version, the lettering, besides the semispherical cover 23, is visible at night from both directions.

The Electrical Connection in the Alternative Embodiment

As seen in FIGS. 14, 18 and 19, bulb 50 is maintained in electrical contact with the positive terminal of battery 66 which is connected to the negative terminal battery 67 which in turn is connected to spring 57 forming part of detachable bottom 55 having metal tab 55a that connects to long metal strip 101 of outer tube 34 when the detachable bottom is inserted. At the bottom of light element 20 on the side of light element 20 that is opposite from or 180 degrees rotation away from button means 37 is bendable metal strip 88 inserted into two parallel horizontal slit openings 81 and 85, which are merely a means to attach bendable metal strip 88. As seen in FIGS. 18–19, lower horizontal slit 81 may be approximately midway between upper horizontal slit 85 and lip 79a at the very bottom of light element 20. One end of bendable metal strip 88 is fastened to light element 20 by being wrapped around the two slits 81 and 85 in light element 20. The other end of metal strip 88 hangs down or may be fastened to lower lip 79a of light element 20 (for example by a groove between lower lip 79a and the outer wall of light element 20 or even by adhesive). Between the two horizontal slits of slit opening 85 is bulge 89 in the wall of light element 20 whose purpose is to push metal strip 88 outward away from the side wall of light element 20 and into contact with long metal strip 101, its metal counterpart on the inside of outer tube 34 of handle portion 30, to create a metal on metal connection when the light element 20 pops up. Because rectangular groove 130 allows room for metal strip 88 which cannot move side to side, this also serves to keep light element 20 from rotating side to side.

As seen in FIGS. 18–19, when light element 20 is moving upward after button knob 37a is pushed, metal strip 88 comes into contact with long metal strip 101 thus creating a metal on metal connection. However, there is no completion of the electric circuit until the light element 20 is fully extended and metal strip 88 approaches the area of bulb 50. When that happens, metal strip 88 is tightly maintained between long metal strip 101 and the metallic clip 51a attached to bulb 50 thus creating an electric circuit and lighting light bulb 50 in a conventional manner. The metallic clip 51a descends from metallic ring 51 surrounding bulb 50 or a piece of metal in contact with light bulb 50. The completion of the electrical circuit lights bulb 50 causes a bright yellow light to emanate from cover 23 of light element 20 and a bright light to emanate from the transparent letters of the word "TAXI" and at the annular bands 20A because cover 23 and annular bands 20A of light element 20 are made from yellow translucent plastic and because the transparent lettering is the only other area of light element 20 that is not opaque or black. In addition, in all embodiments, bulb 50 should be a very strong bulb in order to create a bright light. An example of a tiny bulb that is exceedingly bright when connected to two AAA batteries is the Xenon Star Gas-Filled Sub-Miniature Lamp.

In the alternative embodiment of beacon 10, although light element 20 fits snugly between inner tube 35 and outer tube 34 of handle portion 30, when the device 10 is in the open position, and the user pushes down on light element 20 to re-insert it into handle portion 30, metal strip 88 does not obstruct the reinsertion of light element 20 into handle portion 30 because of groove 130 containing long metal strip 101 running lengthwise down outer tube 34 of handle portion 30. Groove 130 is 180 degrees rotationally opposite from button 37.

In use, a pedestrian holding the handle portion 30 of device 10 by hand presses button knob 37a while holding the device 10 outward. When light element 20 pops up, it lights up the bulb 50. As a result, the light travels from bulb 50 up through light element 20 and is emitted from the light element 20 at any point that is transparent and not colored black. In particular, this means that a bright yellow light is emitted through the openings carved out by the letters "TAXI" as well as through cover 23 and through annular bands 20A above and below the lettering. The combination of the word "TAXI" being brightly lit up surrounded by the yellow annular bands 20A and the semi-spherical cover 23 being brightly lit immediately signals taxicabs that the holder of the device 10 desires a ride in a taxi.

It should be apparent that because of the semispherical shape of translucent cover 23, light is emitted from cover 23 from all sides and not only axially from the bulb 50. Accordingly, an observer reading the bright lettering on the side of light element 20 will also be able to see a bright yellow light to the left or right of the lettering, as the case may be.

Generally, it is expected that the outer portion of handle portion 30 of device 10 will be colored in bright yellow to signify its association with taxis and in addition there may be a black and white checkerboard insignia of a taxicab thereon. In addition, the entire beacon device 10 is lightweight since it is mostly plastic. In the preferred embodiment, the beacon 10 resembles a taxi because the button housing 37H surrounding button knob 37a is curved like the top of a taxicab.

It should be apparent that numerous modifications may be made to the beacon 10 of the present invention to have it perform functions related to those described herein. For example, the word "TAXI" can be written in other languages. In addition, other words besides "TAXI" can also be used to signal vehicles. In addition, the size of the device 10 may vary. Miniature versions suitable for carrying in a woman's purse as well as larger versions to be carried by a man may be envisioned. Fastening means on the outside of handle portion 30 may also be provided so that the device 10 attaches to a belt loop or any other protrusion or loop. In addition, while bulb 50 is the simplest light emitting element, other light emitting elements may be envisioned. In addition, while the preferred embodiment may utilize two batteries 66, 67 that are of AAA size, other sizes and amounts of batteries may also be used to create a bright light.

With respect to the above description, it is to be realized that the optimum dimensional relationship for the parts of the invention include variations in size, materials, shape, form, function and manner of operation, assembly and use, which are deemed readily apparent and obvious to one skilled in the art, and all equivalent relationships to those illustrated in the drawings and described in the specification are intended to be encompassed by the present invention.

Having described and illustrated the present invention in a preferred embodiment, it should be apparent that numerous modifications may be made by those skilled in the art in order to fit other situations and the invention is not considered limited to the specific examples chosen for purposes of illustration, and includes all modifications and variations that do not depart from the spirit and scope of this invention as claimed in the following claims and reasonable equivalents to the claimed elements.

What is claimed is:

1. A battery-powered beacon for hailing taxis comprising:
   (i) a tubular handle portion essentially comprising an open ended electrically conductive inner tube inside an open ended outer tube, the inner and outer tube generally spaced apart from one another but attached to one another by means of a short tubular fit-in piece at a lower end of a space between the inner and outer tubes,
   said tubular handle portion having a detachable bottom to allow insertion into the inner tube of batteries that rest on a spring in an electrically conductive detachable bottom,
   a top of said inner tube receiving a bulb that is in contact with a descending metallic clip, said bulb contacting a terminal of the batteries, lighting up and transmitting light into a light element when an electric circuit is completed,
   (ii) a tubular light element of transparent plastic having a layer of reflective material adhesively attached to the inside thereof, having a translucent substantially semi-spherical plastic cover at its top, a lower lip of said light element, when fully extended, contacting the inner tube and the descending metallic clip to complete an electric circuit, said tubular light element, in a closed position, sitting on a coil spring and engaged to and telescoped within the handle portion between the inner tube and the outer tube and, in an open position, springing up to complete an electric circuit when button means on the handle portion are pressed thus causing light to radiate through the translucent plastic cover and
   (iii) button means on the handle portion whose protruding member catches an annular groove in the light element in a closed position and, when the button is pushed, releases the protruding member from the light element.

2. A battery-powered beacon for hailing taxis comprising:
   (i) a tubular handle portion essentially comprising an open ended electrically conductive inner tube inside an open ended outer tube, the inner and outer tube generally spaced apart from one another but attached to one another by means of a short tubular fit-in piece at a lower end of a space between the inner and outer tubes,
   said tubular handle portion having a detachable bottom to allow insertion into the inner tube of batteries that rest on a spring in an electrically conductive detachable bottom,
   a top of said inner tube receiving a bulb that is in contact with a descending metallic clip, said bulb contacting a terminal of the batteries, lighting up and transmitting light into a light element when an electric circuit is completed,
   (ii) a tubular light element of transparent plastic having a layer of reflective material adhesively attached to the inside thereof except at transparent portions defining lettering thereon, having a translucent substantially semispherical plastic cover at its top and having an annular metallic lip at a lower end thereof that, when the light element is fully extended, is disposed between the inner tube and the descending metallic clip to complete an electric circuit, said tubular light element, in a closed position, sitting on a coil spring and engaged to and telescoped within the handle portion between the inner tube and the outer tube and, in an open position, springing up to complete an electric circuit when button means on the handle portion are pressed thus causing light to radiate through the transparent lettering and plastic cover and (iii) button means on the handle portion whose protruding member catches an annular groove in the light element in a closed position and, when the button is pushed, releases the protruding member from the light element.

3. The beacon of claim 2, wherein the reflective layer is reflective on both sides.

4. The beacon of claim 2, wherein the inner tube is made of lightweight copper.

5. The beacon of claim 2, wherein the detachable bottom has a metal coil spring surrounded by housing that has an electrically conductive portion for contacting the inner tube.

6. The beacon of claim 2, wherein the protruding member of said button has a fulcrum member depending therefrom toward the outer tube of said handle portion.

7. The beacon of claim 2, wherein the light element has upper and lower annular bands above and below the lettering.

8. The beacon of claim 2, wherein the light element has one or more annular bands above and below the lettering and the detachable bottom has a metal coil spring surrounded by plastic housing that has an electrically conductive portion for contacting the inner tube.

9. The beacon of claim 2, wherein the light element has upper and lower annular bands above and below the lettering, the reflective layer is reflective on both sides and the detachable bottom has a metal coil spring surrounded by plastic housing that has an electrically conductive portion for contacting the inner tube.

10. The beacon of claim 2, wherein the light element has upper and lower annular bands above and below the lettering, the reflective layer is reflective on both sides, the inner tube is made of lightweight copper, the detachable bottom has a metal coil spring surrounded by plastic housing that has an electrically conductive portion for contacting the inner tube and the protruding member of said button has a fulcrum member depending therefrom toward the outer tube of said handle portion.

11. A battery-powered beacon for hailing taxis comprising:

(i) a tubular handle portion essentially comprising an open ended inner tube inside an open ended outer tube, the inner and outer tube generally spaced apart from one another but attached to one another by means of a short tubular fit-in piece at a lower end of a space between the inner and outer tubes, said outer tube having on its inside wall a long metal strip, said tubular handle portion having a detachable bottom to allow insertion into the inner tube of batteries that rest on a spring in the detachable bottom, wherein a metal strip in the detachable bottom aligns with and contacts the long metal strip when the detachable bottom is inserted, a top of said inner tube receiving a bulb that is in contact with a metallic piece, said bulb contacting a terminal of the batteries, lighting up and transmitting light into a light element when an electric circuit is completed, (ii) a tubular light element of partly opaque plastic having transparent portions defining the letters T A X I thereon, having a translucent substantially semispherical plastic cover at its top and having a metal strip attached to a lower end thereof that, when the light element is fully extended, is disposed between the long metal strip of the outer tube and the metallic piece to complete an electric circuit, said tubular light element, in a closed position, sitting on a coil spring and engaged to and telescoped within the handle portion between the inner tube and the outer tube and, in an open position, springing up to complete an electric circuit when button means on the handle portion are pressed thus causing light to radiate through the transparent lettering and through the plastic cover and (iii) button means on the handle portion that in a closed position causes the light element to catch the handle portion and that when pushed releases the light element from said handle portion to an open position.

12. The beacon of claim 11, wherein said button means comprises a button on an outer wall of said outer tube that when pressed in a closed position causes a pin to traverse the space between the outer tube and the light element and to press against a lip on a bendable cut-out strip defined on the light element, said lip being otherwise caught in an opening in said outer tube.

13. The beacon of claim 11, wherein said button means comprises a button on an outer wall of said outer tube that when pressed in a closed position causes a pin to traverse the space between the outer tube and the light element and to press against a lip at one end of a bendable generally rectangular cut-out strip defined on the light element, said lip being otherwise caught in an opening in said outer tube.

14. A battery-powered beacon for hailing taxis comprising:

(i) a tubular handle portion essentially comprising an open ended inner tube inside an open ended outer tube, the inner and outer tube generally spaced apart from one another but attached to one another by means of a short tubular fit-in piece at a lower end of a space between the inner and outer tubes, said outer tube having on its inside wall a long metal strip, said tubular handle portion having a detachable bottom to allow insertion into the inner tube of batteries that rest on a spring in the detachable bottom, wherein a metal strip in the detachable bottom aligns with and contacts the long metal strip when the detachable bottom is inserted, a top of said inner tube receiving a bulb that is in contact with a metallic piece, said bulb contacting a terminal of the batteries, lighting up and transmitting light into a light element when an electric circuit is completed, (ii) a tubular light element of partly opaque plastic having transparent portions defining the letters T A X I thereon, having a translucent substantially semispherical plastic cover at its top and having a metal strip attached to a lower end thereof that, when the light element is fully extended, is disposed between the long metal strip of the outer tube and the metallic piece to complete an electric circuit, said tubular light element, in a closed position, sitting on a coil spring and engaged to and telescoped within the handle portion between the inner tube and the outer tube and, in an open position, springing up to complete an electric circuit when button means on the handle portion are pressed thus causing light to radiate through the transparent lettering and through the plastic cover, said light element having within it light enhancement means to increase the amount of light emanating from the bulb that is emitted through the transparent lettering and (iii) button means on the handle portion that in a closed position causes the light element to catch the handle portion and that when pushed releases the light element from said handle portion to an open position.

15. The beacon of claim 14, wherein said button means comprises a button on an outer wall of said outer tube that when pressed in a closed position causes a pin to traverse the space between the outer tube and the light element and to press against a lip on a bendable cut-out strip defined on the light element, said lip being otherwise caught in an opening in said outer tube.

16. The beacon of claim 14, wherein said button means comprises a button on an outer wall of said outer tube that when pressed in a closed position causes a pin to traverse the space between the outer tube and the light element and to press against a lip at one end of a bendable generally rectangular cut-out strip defined on the light element, said lip being otherwise caught in an opening in said outer tube.

17. The beacon of claim 14, wherein said light enhancement means comprises a strip of reflective lettering adhesively attached to the inside of said light element.

18. The beacon of claim 14, wherein said button means comprises a button on an outer wall of said outer tube that when pressed in a closed position causes a pin to traverse the space between the outer tube and the light element and to press against a lip on a bendable cut-out strip defined on the light element, said lip being otherwise caught in an opening in said outer tube and wherein said light enhancement means comprises a strip of reflective lettering adhesively attached to the inside of said light element.

19. The beacon of claim 14, wherein said button means comprises a button on an outer wall of said outer tube that when pressed in a closed position causes a pin to traverse the space between the outer tube and the light element and to press against a lip at one end of a bendable generally rectangular cut-out strip defined on the light element, said lip being otherwise caught in an opening in said outer tube and wherein said light enhancement means comprises a strip of reflective lettering adhesively attached to the inside of said light element.

* * * * *